(12) United States Patent
Sugimasa et al.

(10) Patent No.: US 8,142,626 B2
(45) Date of Patent: Mar. 27, 2012

(54) ELECTROLYZER AND ELECTRODES

(75) Inventors: Masatoshi Sugimasa, Tokai (JP); Akiyoshi Komura, Hitachi (JP); Masafumi Nojima, Tokai (JP)

(73) Assignee: Hitachi, Ltd., Tokyo (JP)

( * ) Notice: Subject to any disclaimer, the term of this patent is extended or adjusted under 35 U.S.C. 154(b) by 447 days.

(21) Appl. No.: 12/314,724

(22) Filed: Dec. 16, 2008

(65) Prior Publication Data
US 2009/0152118 A1    Jun. 18, 2009

(30) Foreign Application Priority Data
Dec. 17, 2007 (JP) ................ 2007-324162

(51) Int. Cl.
*C25B 11/02* (2006.01)
*C25B 11/03* (2006.01)
*C25B 11/04* (2006.01)
*C25B 11/06* (2006.01)
*C25B 11/08* (2006.01)

(52) U.S. Cl. .............. 204/284; 204/290.01; 204/290.12; 204/290.14; 204/280

(58) Field of Classification Search ............ 204/290.01, 204/290.12, 290.14, 284, 280, 289
See application file for complete search history.

(56) References Cited

U.S. PATENT DOCUMENTS

| | | | | |
|---|---|---|---|---|
| 5,294,319 A | * | 3/1994 | Kaczur et al. | 204/290.03 |
| 6,071,570 A | * | 6/2000 | Hardee et al. | 205/67 |
| 2001/0052468 A1 | * | 12/2001 | Jacobo et al. | 205/208 |
| 2010/0084266 A1 | * | 4/2010 | Di Franco | 204/290.01 |

FOREIGN PATENT DOCUMENTS

| | | |
|---|---|---|
| JP | 07-316862 | 12/1995 |
| JP | 2002-317289 | 10/2002 |
| JP | 2005-015818 | 1/2005 |

* cited by examiner

*Primary Examiner* — Bruce Bell
(74) *Attorney, Agent, or Firm* — Antonelli, Terry, Stout & Kraus, LLP.

(57) ABSTRACT

An the electrode for electrolysis of an electrolytic solution comprises an electrode core serving as a base and a plurality of prominences formed on a surface of the electrode core, the prominences have each a leaf-shaped form and rises from the electrode core surface.

17 Claims, 4 Drawing Sheets

ELECTROLYZER AND ELECTRODES

CLAIM OF PRIORITY

The present application claims priority from Japanese application serial no. 2007-324162, filed on Dec. 17, 2007, the contents of which are hereby incorporated by references into this patent application.

FIELD OF THE INVENTION

The present invention relates to an electrode used for electrolysis and method thereof, and also to an electrolyzer for producing hydrogen by electrolysis of water.

BACKGROUND OF THE INVENTION

Under the current circumstances where large consumption of fossil fuels has continued and global warming traceable to carbon dioxide and the like and air pollution in urban areas pose a serious concern, attention has been paid to hydrogen used as a next generation energy source in place of the fossil fuels. Since hydrogen discharges only water after the use thereof, this gas is considered as a clean energy source with a reduced environmental burden.

Although the most popular hydrogen producing technique is steam reforming of fossil fuels, there are known a diversity of other techniques such as side-produced hydrogen accompanied by the manufacture of iron or soda, thermal cracking reaction, photocatalytic reaction, microorganism reaction, electrolysis of water and the like. In particular, electric power necessary for the electrolysis of water can be supplied from a variety of sources and thus, the electrolysis is emphasized as an energy source that does not rely on specific areas. If electric power based on a reproducible energy such as from solar generation or wind generation is used, the discharge amount of carbon dioxide during power generation can be suppressed to a very small level.

For the electrolysis of water, there are known two techniques including a technique using a solid polymer membrane as an electrolyte and a technique using an alkaline aqueous solution. The solid polymer electrolysis using a solid polymer membrane as an electrolyte is advantageous in that a current density can be enhanced and involves a problem in that only carbon and noble metals are used as an electrode material because the membrane is strongly acidic. On the other hand, the alkaline electrolysis using an alkaline aqueous solution as an electrolyte has already shown satisfactory results over 70 years or more after practical use with good economy and thus, occupies most of the large-scale hydrogen producing apparatus.

The soft steel plated with Ni of high catalytic activity has been used mainly as an alkaline electrode, but with a problem in that ordinary Ni plating results in small surface irregularities, so that a specific surface area becomes so small as not to increase a current density. To cope with this problem, there have been developed techniques of providing an electrode surface with a high specific surface area, for example, a technique of electroforming a nanostructure on the surface using to a transfer plate technique of ordinarily roughening an electrode surface by use of a nanomold, a technique of shaping Ni fine particles into an electrode (e.g. Japanese Laid-open Patent Application No. 2002-317289), a technique of forming a metal serving as an electrode on a nanoporous structure (e.g. Japanese Laid-open Patent Application No. Hei 7-316862), and the like. Moreover, there have been developed a vacuum deposition process without resorting to a plating process and a surface treating method of nanostructures, such as nanofillers, nanoparticles and the like, by a dry process. In addition, the manufacture of electrodes by arc plating has also been proposed (e.g. Japanese Laid-open Patent Application No. 2005-15818).

With respect to electrodes for an alkaline water electrolyzer, there is a strong demand of developing a technique of enhancing a specific surface area so as to increase a current density.

The electrode for alkaline water electrolysis should have a certain area. This requires an increasing number of processes for the manufacture of a nanomold or nanoporous structure, and a vacuum apparatus is separately necessary for a system of creating a Ni film of high specific surface area in a dry process. In order to ensure low costs of a hydrogen producing apparatus of the water electrolysis type, it is essential to develop a process in which the Ni electrode surface with a large surface area can be readily formed so as to have a high specific surface area by a simple procedure.

The mere increase of specific surface area involves problems in that a solution resistance increases by adhesion of gas bubbles generated upon water electrolysis and thus, a current density cannot be increased and that the Ni structure of high specific surface area peels off by means of the gas pressure. Thus, it is necessary to provide a Ni structure that is not susceptible to an influence of the bubbles.

In order to overcome the above-stated problems, an object of the invention is to provide an electrode for electrolysis wherein a Ni electrode of a large surface area is simply enabled to have a high specific surface area and which is not susceptible to an influence of gas bubbles generated upon water electrolysis and also a method for manufacturing such an electrode.

SUMMARY OF THE INVENTION

In order to achieve the above object, an electrode for electrolysis of an electrolytic solution is characterized by comprising an electrode core serving as a base and a plurality of fine prominences formed on a surface of the electrode core, wherein the prominences, respectively, have a leaf-shaped form rising from the surface of the electrode core.

The invention also provides a method for manufacturing an electrode for electrolyzing an electrolytic solution, the method characterized by comprising subjecting a surface of an electrode core to electroplating treatment with an electroplating solution capable of forming prominences on the surface of the electrode core. The electroplating solution contains at least one of hydrocarbon additives, aliphatic additives and aromatic additives, each having at least one sulfonic acid group, and a concentration of the additive is preferably in the range of 0.01 to 10 wt % with respect to the total amount of the electroplating solution.

While the specific surface area of the electrode is enhanced by the formation of the fine prominences over the entire surface of the electrode, the prominences are each formed as a leaf shape thereby providing a structure wherein individual prominences are randomly distributed while rising. This structure enables the bubbles generated by electrolysis to be likely to run off and also the prominences to be unlikely to be fallen away. Moreover, the development of an electroplating solution capable of making the prominences and the establishment of plating conditions make it possible to realize a Ni electrode surface with a high specific surface area only by an electroplating process.

According to the invention, a Ni coated electrode wherein leaf-shaped prominences that have a high specific surface area and are resistant to falling off by the action of bubbles are formed on the entire surface thereof can be fabricated by an electroplating process. When using this electrode, it is possible to realize an electrolyzer as a hydrogen producing apparatus capable of doing alkaline water electrolysis at high current density.

DETAILED DESCRIPTION OF THE PREFERRED EMBODIMENTS

Figure 1:
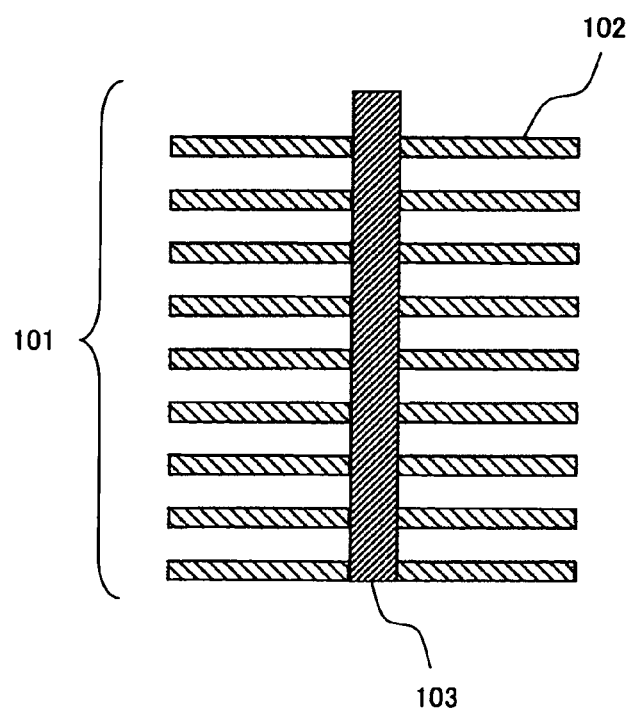
FIG. 1 is a schematic sectional view of an electrode for electrolysis of the present invention.

The electrode for electrolysis of the invention is comprised of an electrode core serving as a base and a plurality of fine prominences formed on the surface of the electrode core. The prominences have a leaf-shaped form rising from the surface of the electrode core.

The members of the electrode for electrolysis of the present invention and its manufacturing procedure are described below.

The electrode has fine prominences over the entire surface thereof, which makes it possible to provide a high specific surface area essential for high current densification. The materials for forming the prominences may be any of metals, oxides, sulfides, borides, nitrides and phosphides so far as they are effective in water hydrolysis. Metals materials include, for example, metals such as Ni, Pd, Pt, Rh, Ir, Re, Ru, Co, Fe, Ag and the like and alloys thereof. Among them, platinum group metals, such as Pd, Pt, Rh, Ir, Re and Ru, are small in overvoltage accompanied by generation of hydrogen and oxygen and exhibit excellent catalytic characteristics. Nevertheless, their material costs are high and supply risk is involved because of the rare elements, thus making it difficult to use them for a large-sized electrode. Taking the life and ease in handling in addition to the catalytic performance and the material costs into consideration, it is preferred to make the prominence structure from Ni.

The prominences are formed on the surface of the electrode core serving as a base. The electrode core involves no problem so far as it allows an electric current to pass therethrough easily and is stable in an alkaline aqueous solution. Preferred examples include metals such as Fe, Cu, Ni and the like and alloys thereof. A soft steel employed in conventional alkaline water electrolysis may be used as the electrode core.

The prominences preferably cover the entire electrode surface therewith for the purpose of improving the specific surface area of the electrode. In this regard, however, no prominence structure may be formed at a portion thereof not immersed in an alkaline aqueous solution for reducing material costs and at a portion which is free of or small in contribution to the electrolysis reaction, such as a portion not facing with a counter electrode.

The prominences are not limited in shape so far as it has a shape capable of fundamentally realizing a high specific surface area. Generally, formation of a fine structure can realize a high specific surface area. Although the specific surface area increases with a decreasing size of the fine structure, the material strength of the fine structure may lower. Maximization of the specific surface area may be realized with formation of spherical prominences. However, since the spherical prominences are brought into point-to-point contact, bonding between the spherical prominences becomes weak, the prominences are prone to peel away. Next, there are mentioned techniques of forming elongated fillers or pillars as prominences. In the case, although the specific surface area increases with an increasing aspect ratio of the filler or pillar, the material strength of the prominences becomes weaken due to the relative fineness.

Accordingly, the prominences preferably take each a leaf-shaped prominence. The leaf-shaped prominence used herein is defined as follows. When coordinates that are normal to each other on a plane parallel to the surface of the electrode core are defined as x and y axes, and when one side of the prominence is taken as x axis, the leaf-shaped prominence defined as one where the length of a side along the y axis invariably differs from the length along the x axis, namely the structure of the prominence takes on a shape of aspect ratios differing in the x and y axes and where a side extending from the surface of the electrode core in a height direction (z axis direction has a curve. Since the leaf-shaped prominence has a minor axis and a major axis on a plane parallel to the surface of the leaf-shaped prominence, if the major axis has a certain length, the material strength of the leaf-shaped prominence can be enough held even after micro-fabrication. It is known in the field of electrochemical reaction that the end of a structure called "kink" is a site that is most likely to undergo the reaction. According to the leaf-shaped prominence, since the sides thereof extend along a curve from the tip thereof to the bottom, kinks become larger in number than a linear pillar-shaped prominence, thus being advantageous as an electrode shape used in the electrochemical reaction.

Further, the invention is characterized in that the respective leaf-shaped prominences rise from the surface of the electrode core. This structure is described in more detail as follows. In the practice of the invention, each leaf-shaped prominence develops from the electrode core surface and grow along the height and thus, an aspect ratio in the height direction becomes large. Since contact between the leaf-shaped prominences is small, an opening is prone to be formed therebetween. Since the structure of the leaf-shaped prominences enable to have a number of openings therebetween along the height, bubbles generated by the water electrolysis reaction in the vicinity of the electrode core surface can run off without staying. Incidentally, in the case of a fine structure applied with nano-prominences without leaf-shaped prominence on the surface of the electrode core, since the nano-prominences has a great number of contacts therebetween, so that bubbles are liable to be accumulated therein. Thus, the nano-prominences are liable to be peeled away by means of the pressure of the bubbles. In addition, electrode portions in contact with the bubbles do not serve as an electrode, with the attendant problem that the specific surface area is reduced. According to the leaf-shaped prominences of the invention, bubbles are likely to run off therefrom, so that these problems can be solved. As the leaf-shaped prominences are mutually arranged irregularly, even when an incidental trouble occurs due to a sudden pressure change under the influence of accumulated bubbles ascribed to the angle of the electrode and the flow of the alkaline aqueous solution, breakage of all the leaf-shaped prominences can be avoided.

The purpose of forming the leaf-shaped prominences is to improve the specific surface area, a smaller size the prominences effect better. In this connection, however, too small a size leads to the lowering of material strength. Taking the balance between the specific surface area and the material strength into consideration, the leaf-shaped prominences should preferably have a minor axis of 5 to 100 nm and a major axis of 50 to 1000 nm. More preferably, the minor axis ranges from 10 to 50 nm and the major axis ranges from about 100 to 500 nm. Although a higher leaf-shaped prominence is more beneficial from the aspect of specific surface area, this is disadvantageous from the standpoint of material strength and thus, the height of the leaf-shaped prominence is preferably in the range of 100 to 10000 nm, more preferably 500 to 5000 nm.

The prominences of the invention are characterized by being formed by electroplating. Since each leaf-shaped prominence is formed from the electrode core surface by electroplating, the prominences and the electrode core are mutually bonded together by metallic bond. This leads to stronger bonding strength, more unlikelihood to peel away and longer life than with the case of coating of a nanostructure using a binder or the like. Because the prominences can be formed by a single electroplating process using an electroplating aqueous solution, the electrode core has great freedom with respect to the shape thereof. With a nanostrucutre using a nano mold, only flat electrode cores such as plates, films and the like are used with the structure being formed only one side. The prominences of the invention may be applied to any shape and any type of material so far as the core has a conductive surface. The prominences may be formed either on opposite sides or on one side at any positions of the conducive surface. Accordingly, when prominences are formed on a surface of an electrode core, such as of a metal mesh, a porous body or the like, which is higher in specific surface area than a plate or film, a higher electric current density is enabled.

Since the electrode of the invention in which prominences having a leaf-shaped structure are formed over the entire surface of the electrode core has a high specific surface area, a higher current density over that of a conventional Ni-plated electrode can be passed, thereby contributing to an increased amount of hydrogen capable of being produced per unit time when being used for water electrolysis reaction. Because the leaf-shaped prominences are formed so as to rise directly from the electrode, the bond strength with the electrode core as the base is high and bubbles formed with the hydrogen generation can readily run off. Accordingly, the overvoltage can be suppressed at a lower level at a high current density when compared with the case of a known Ni plated electrode. In addition, the resistance to peeling is high, the electrode life can be maintained at a level substantially equal to that of the conventional plated electrode while increasing the capability of hydrogen production.

Regarding the leaf-shaped prominences having such features, it is difficult to fabricate them by using conventional plating solutions and conditions. The fabrication is also difficult even if using other measures, i.e. a surface roughening technique using etching or the like and a dry process based on vacuum deposition, sputtering or the like. The leaf-shaped prominences can be fabricated only by an electroplating treatment using an electrolytic solution capable of forming the prominences on the surface of an electrode core serving as a base. This electroplating solution is not limited with respect to the composition thereof and preferably contains additives containing sulfonic acid. The type of additive containing sulfonic acid is not limited so far as it is readily soluble in an electroplating solution. In view of costs, ease in availability and environmental aspect, organic compounds having a sulfonic acid group are preferred and examples include benzenesulfonic acid, toluenesulfonic acid, phenolsulfonic acid, sulfobenzoic acid, naphthalenesulfonic acid, naphthoquinonesulfonic acid, and sulfonates of straight-chain hydrocarbon (e.g. sodium dodecylsulfate).

The effect of the sulfonic acid group-containing additives is considered as follows: the additive specifically adheres on the surface of deposited Ni to impede Ni ions from depositing, so that a Ni-plated film anisotropically grows. The specific adhesion of the additive is greatly influenced by the concentration of the additive present in the electroplating solution. Accordingly, the concentration of the additive is preferably within a range of 0.01 to 10 wt %, more preferably from 0.1 to 5 wt %, of the total amount of the electroplating solution. If a halogen or sulfur that is higher in adhesion than sulfonic acid is contained in the electrolytic solution, the effect of the additive may be weakened in some case and such an ingredient is not favorable but may be present although depending on the concentration.

The electrolytic conditions are not limited especially. In this regard, however, excessive agitation and a temperature rise of the electroplating solution are not favorable because they are factors of impeding the specific adhesion of the sulfonic acid group-containing additive. Preferable conditions are, for example, such that no agitation is made and electroplating is performed at a temperature of about 15 to 40° C.

The electrode for electrolysis according to the invention is useful in a variety of electrolyzers and may be applied as a hydrogen electrode and an oxygen electrode of a hydrogen producing apparatus wherein the hydrogen electrode and the oxygen electrode are arranged in face-to-face relation and an electrolytic solution is provided between the hydrogen electrode and the oxygen electrode. The most effective use of the electrode is application to an alkaline electrolysis apparatus for producing hydrogen wherein an alkaline aqueous solution whose major problem is how to create a high current density is used as an electrolyte. Although the alkaline aqueous solution existing between the electrodes is not limited especially, sodium hydroxide or potassium hydroxide is preferred from the standpoints of costs and electric conductivity. Especially, an alkaline aqueous solution containing 1 to 90 wt % of potassium hydroxide or sodium hydroxide is most preferred from the standpoints of low costs and high electric conductivity. In this connection, however, the alkaline aqueous solution forms a carbonate due to the presence of carbon dioxide in air thereby lowering the performance of the electrolyte. Accordingly, it is necessary to reduce contact with air to a minimum or to circulate the electrolytic solution per se. Alternatively, a distance between the electrodes may be narrowed sufficiently to permit the electrolytic solution to be supplied by a capillary phenomenon, or the electrolytic solution may be supplied by absorption in a hydrophilic layer.

Further, when the electrode for electrolysis of the invention is applied as a hydrogen electrode and an oxygen electrode, respectively, there can be provided a hydrogen producing apparatus which comprises a hydrogen electrode and an oxygen electrode arranged in face-to-face relation and an electrolytic solution supplied between the hydrogen electrode and oxygen electrode wherein the hydrogen electrode and oxygen electrode, respectively, have a face in contact with the electrolytic solution and another face in contact with a gas and the apparatus have a gas-liquid separation function. In such a hydrogen producing apparatus, the gases generated by electrolysis of the electrolytic solution are released from the faces of the electrodes in contact with the gases. The electrode takes a form having faces in contact with the electrolytic solution and the gas, respectively. For a general instance, such a form includes any of a plate, a sheet, a mesh and a porous body. In order to release the gas generated by the electrolysis of the electrolytic solution from the face in contact with the gas, through-holes exist in the electrode. With the hydrogen producing apparatus of the invention, since the generated gas is released from the face not in contact with the electrolytic solution, no bubbles are formed in the solution. Accordingly, there are no increase in solution resistance ascribed to the bubbles and no coverage of the electrode surface with the bubbles, with the attendant effect that the overvoltage lowers.

The gas-liquid separation function to the electrode can be realized by forming a hydrophobic layer on one face of the electrode. This hydrophobic layer is required to have characteristics for preventing the electrolytic solution from leakage to outside and for releasing the generated gas to outside. To this end, a space of about 1 nm to 10 µm has to be provided inside the layer. The materials for the hydrophobic layer preferably include carbon materials having no substituent group on the surface thereof, such as black lead, graphite and the like, or polymers containing a hydrophobic group such as an alkyl group, a fluorine group or the like. For the formation, it is the simplest to use a procedure, already known as a general technique of making a gas diffusion electrode of fuel cells, wherein a finely divided carbon material is formed as a layer by using a hydrophobic polymer such as polytetrafluoroethylene (PTFE) as a binder. Alternatively, there may be used a mesh, a non-woven fabric, a sheet or a paper formed of carbon fibers, or a porous body, a mesh, a non-woven fabric or a woven fabric formed of a hydrophobic polymer.

When hydrogen is produced by electrolysis, no limitation is placed on a supply source of necessary power. A system power supply may be used, or electric power may be supplied directly from a nuclear power plant or a heat power plant. If solar cells, wind power or water power is utilized, hydrogen can be produced without discharge of carbon dioxide. Alternatively, electric power stored in batteries may be used. With nuclear power generation or heat power generation or with solar cells, heat can be supplied along with the electric power. For the electrolysis reaction of water, a higher temperature leads to a lower necessary voltage, so that an energy utilization efficiency associated with the hydrogen production can be improved. Where electric generators using motors or engines are used, heat and electric power can be supplied and thus, the efficiency becomes high.

The best mode for carrying out the invention is described by way of specific examples, which should not be construed as limiting the invention thereto.

Embodiment 1

This embodiment is directed to an instance of an electrode used in an electrolytic hydrogen producing apparatus using an alkaline aqueous solution and also to a method for making same.

Figure 2:
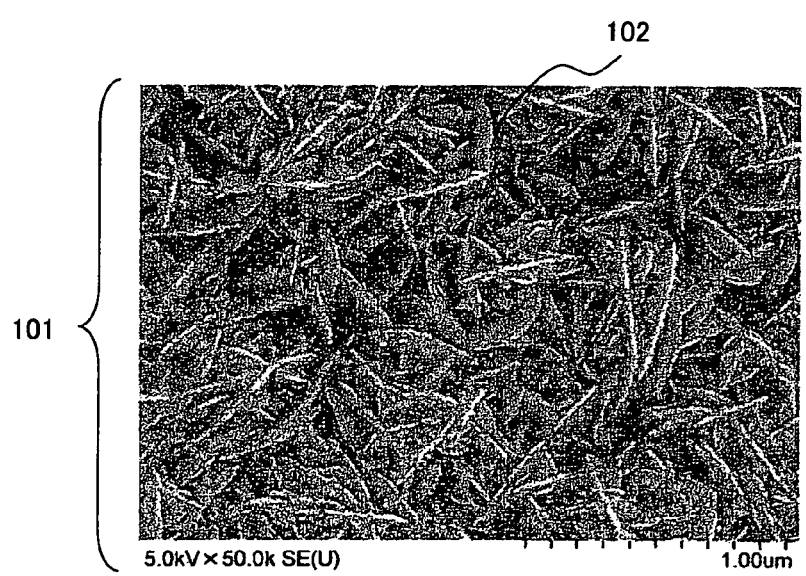
FIG. 2 is a surface image of an electrode of the present invention observed through a scanning electron microscope.

FIG. 1 is a schematic sectional view showing an instance of an electrode 101 of the invention. The electrode 101 is comprised of prominences 102 and an electrode core 103. The prominences 102 are metal-bonded with the electrode core 103 and each have a leaf-shaped form. Since prominences 102 shown in FIG. 1 are drawn by schematic sectional diagram, the leaf-shaped form thereof is not shown in FIG. 1, but the detail of the leaf-shaped form of the prominences 102 are shown in FIG. 2, and they are described later. The prominences 102 although rises perpendicularly from the electrode core 103 as shown in FIG. 1, they may rises from the electrode 103 with inclination. The sectional structure of each prominence 102 may have a thickness kept constant from the bonded portion with the electrode core 103 to the tip thereof as shown in FIG. 1 or may be sharp at the tip thereof. The prominences 102 are formed on the electrode core 103 with an electroplating technique. The prominences 102 may be formed at any portions of the electrode core 103. In the schematic sectional view showing the electrode 101, there is shown an instance where the prominences 102 are formed on opposite sides of the electrode core 103.

Figure 3:
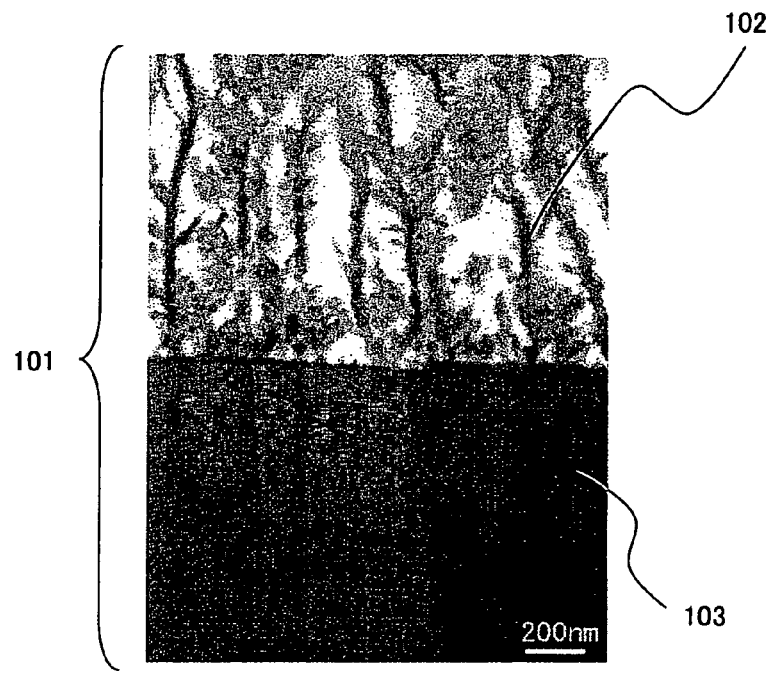
FIG. 3 is a sectional image of an electrode of the invention observed through a transmission electron microscope.

FIG. 2 is a surface image observed through a scanning electron microscope and showing an instance of the electrode 101 of the invention. The prominences 102 having a leaf-shaped form are randomly arranged on the surface of the electrode core. Each prominence 102 has a minor-axis length of about 20 to 50 nm and a major-axis length of about 500 to 800 nm. FIG. 3 is a sectional image observed through a transmission electron microscope showing an instance of the electrode 101 of the invention. The prominence 102 rises perpendicularly relative to the electrode core 103 with a height of about 150 nm.

The electrode 101 was made by electroplating using an electroplating solution capable of forming the prominences 102. The electroplating solution used herein was self-prepared and has a composition a 0.5 M nickel sulfate aqueous solution, to which sodium dodecylsulfate was added as an additive at an amount of 5 wt % relative to the weight of water. Nickel sulfate and sodium dodecylsulfate used were, respectively, special grade reagents available from Wako Pure Chemical Industries, Ltd. A copper sheet (available from The Nilaco Corporation) was used as an electrode core, a nickel mesh (available from The Nilaco Corporation) was used as a counter electrode, and a silver/silver chloride electrode (made by BAS Inc.) was used as a reference electrode. The electroplating was carried out by use of the three electrodes under constant voltage conditions of −1V for 300 seconds. After completion of the plating, the electrode surface was observed as black in color with no metallic luster.

In the electrode 101, the prominences 102 were formed on the copper plate surface at a 1 cm square portion thereof, with the other portion being subjected to insulation coverage. In order to confirm that a specific surface area per unit surface of the electrode 101 is improved over an ordinary Ni sheet owing to the formation of the prominences 102, a charge amount at an oxidation peak of Ni in a 1M potassium hydroxide aqueous solution was used as comparison. When Ni is oxidized in an alkaline aqueous solution, a passive layer of nickel oxide is formed on the surface of Ni, and thereby the oxidation reaction is stopped. Therefore, sweeping is carried out from an open potential toward an anode side with a linear sweep voltammetry method, an oxidation peak of Ni appears. It is considered that the peak charge amount is substantially proportional to the surface area of Ni, so that this amount can be used for comparison between specific surface areas of electrodes.

The specific surface area of the electrode 101 was 119 times larger than that of a commercially available Ni plate (made by The Nilaco Corporation), accordingly it could be confirmed that the formation of the prominences 102 contributed to improve the specific surface area.

Embodiment 2

Figure 4:
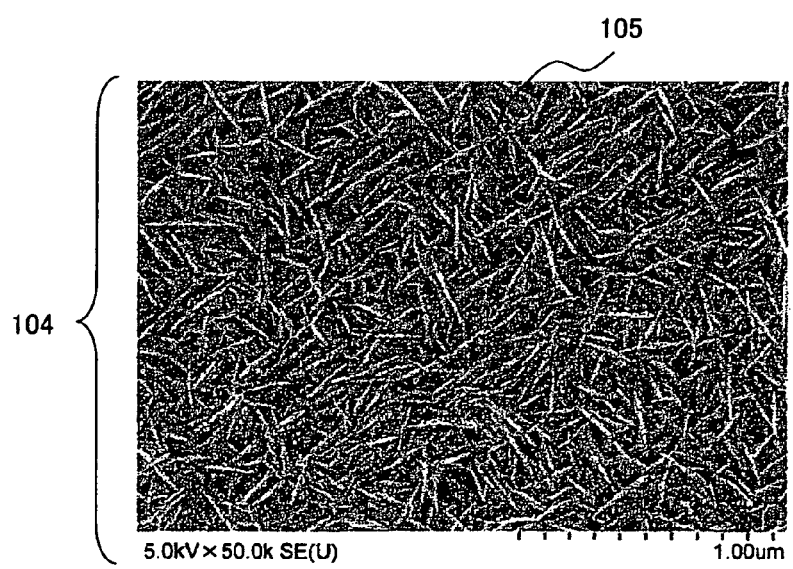
FIG. 4 is a surface observation image of an electrode of the invention through a scanning electron microscope.

In Embodiment 2, the electroplating treatment was carried out with conditions that the additive was changed to toluenesulfonic acid (special grade reagent, made by Wako Pure Chemical Industries, Ltd.). The material of the electrode core and electroplating conditions were same as in embodiment 1. FIG. 4 is a surface image of the electrode 104 of this example observed through a scanning electron microscope. Like the electrode 101, it could be confirmed that leaf-shaped prominences 105 were formed. The prominences 105 had a minor-axis length of about 5 to 20 nm and a major-axis length of about 300 to 800 nm. The specific surface area of the electrode measured on the basis of the peak charge amount was 97 times greater than the area of a commercially available Ni sheet (made by The Nilaco Corporation), so that it could be confirmed that the formation of the prominences 105 contributed to an improvement in the specific surface area.

Comparative Example 1

In Comparative Example 1, a Watts bath was used for an ordinary Ni electroplating treatment. The bath composition had 250 g/liter of nickel sulfate, 45 g/liter of nickel chloride and 30 g/liter of boric acid. All the compounds used were, respectively, made of special grade reagents, made by Wako Pure Chemical Industries, Ltd., thereby preparing the bath composition. A copper plate as used in Embodiment 1 was used as the electrode core. The electroplating conditions were constant electric current conditions of 2 A/dm$^2$. The electrode surface observed after completion of the plating had a dull metallic luster. The specific surface area of the electrode measured on the basis of the peak charge amount was found to be 2.5 times greater than that of a commercially available Ni sheet (made by The Nilaco Corporation).

Comparative Embodiment 2

In Comparative Embodiment 2, a roughened Ni surface was formed on an electrode core by electroplating treatment at a high current density. The bath composition was made of 0.5 M nickel sulfate (special grade reagent of Wako Pure Chemical Industries, Ltd.). As the electrode core, a copper plate was used as in Embodiment 1. The electroplating conditions were constant current conditions of 20 A/dm$^2$. The electrode surface after completion of the plating was black in color and a slight metallic luster was observed. The specific surface area of the electrode measured by the peak charge amount was 47 times greater than that of a commercially available Ni sheet (made by The Nilaco Corporation).

Comparative Embodiment 3

In Comparative Embodiment 3, an anodized alumina having a pore diameter of 30 nm on average and a pore depth of 10 μm was provided as a matrix and subjected to Ni plating to provide a fine Ni columnar structures. For the fabrication, Ni was deposited in about 20 nm by electroless plating on an anodized alumina surface used as a seed layer for electroplating. The electroless plating bath used was NPR-4, made by C. Uyemura & CO., LTD. Next, Ni was deposited inside the pores of the anodized alumina by use of the Watts bath as employed in Comparative Embodiment 1. The plating conditions were same as those in Comparative Embodiment 1. Thereafter, the anodized alumina was dissolved by means of a 1M potassium hydroxide aqueous solution to provide a Ni electrode having fine columnar structures. After completion of the plating, the electrode surface had a metallic luster and the specific surface area of the electrode measured with on the peak charge amount was found to be 35 times greater than that of a commercially available Ni plate (made by The Nilaco Corporation).

Embodiment 3

In Embodiment 3, a Ni mesh (made by The Nilaco Corporation) was used as an electrode core. The electrolytic conditions were same as in Embodiment 1. The electrode surface obtained after completion of the plating was black in color like Embodiment 1 and no metallic luster was observed. The surface was observed through a scanning electron microscope, from which it could be confirmed that leaf-shaped prominences were irregularly arranged over the entire surface of the electrode like Embodiment 1. The prominences had a minor-axis length of about 30 to 60 nm and a major-axis length of about 300 to 1200 nm.

In order to confirm the performance of the electrode for a hydrogen producing apparatus, an overvoltage at arbitrary current densities was measured. For the measurement, a three electrode system was used including a nickel mesh (made by The Nilaco Corporation) as a counter electrode and a silver/silver chloride electrode (made by BAS) as a reference electrode. A 1M potassium hydroxide aqueous solution was used as a solution. An overvoltage at a current density of 0.7 A/cm$^2$ lowered by 0.6 V compared to the case using a Ni mesh alone as an electrode core. When the electrode was repeatedly used in a current density range of from 0.01 A/cm$^2$ to 1.0 A/cm$^2$, whereupon no pee of the plated film could be recognized.

Embodiment 4

In Embodiment 4, a Ni mesh (made by The Nilaco Corporation) was used as an electrode core. The electroplating conditions were same as in Embodiment 2. The electrode surface after completion of the plating was black in color as in Embodiment 1 and no metallic luster was observed. The observation of the surface through a scanning electron microscope revealed that the leaf-shaped prominences were irregularly arranged throughout the surface like Embodiment 2.

In order to confirm the performance as an electrode for hydrogen producing apparatus, an overvoltage at arbitrary current densities was measured. For the measurement, a three electrode system was used wherein a nickel mesh (made by The Nilaco Corporation) was provided as a counter electrode and a silver/silver chloride electrode (made by BAS) was provided as a reference electrode. A 1M potassium hydroxide aqueous solution was used as a solution. An overvoltage at a current density of 0.7 A/cm$^2$ lowered by 0.48 V compared to the case using a Ni mesh alone as an electrode core. Repeated use in a current density range of from 0.01 A/cm$^2$ to 1.0 Acm$^2$ revealed no peel of the plated film.

Comparative Embodiment 4

In Comparative Embodiment 4, a Ni mesh (made by The Nilaco Corporation) was provided as an electrode core. The electroplating conditions were same as in Comparative Embodiment 2. In order to confirm the performance as an electrode for hydrogen producing apparatus, an overvoltage at arbitrary current densities was measured. For the measurement, a three electrode system was used wherein a nickel mesh (made by The Nilaco Corporation) was provided as a counter electrode and a silver/silver chloride electrode (made by BAS) as a reference electrode. A 1M potassium hydroxide aqueous solution was used as a solution. An overvoltage at a current density of 0.7 A/cm$^2$ lowered by 0.32 V compared to the case using a Ni mesh alone as an electrode core. When a current density was measured up to 0.7 A/cm$^2$, the plated film peeled away from the electrode core. Thus, no repetition test could be performed.

Embodiment 5

In Embodiment 5, a Ni porous body (made by The Nilaco Corporation) was provided as an electrode core. The electroplating conditions were same as in Embodiment 1. The electrode surface after completion of the plating was black in color like Embodiment and no metallic luster was observed. The observation of the surface through a scanning electron microscope revealed that the leaf-shaped prominences were irregularly arranged throughout the surface like Embodiment 1. The prominences had a minor-axis length of about 20 to 50 nm and a major-axis length of about 200 to 1000 nm.

In order to confirm the performance as an electrode for hydrogen producing apparatus, an overvoltage was measured as arbitrary current densities. For the measurement, a three-electrode system was used wherein a nickel mesh (The Nilaco Corporation) was used as a counter electrode and a silver/silver chloride electrode (made by BAS) as a reference electrode. A 1M potassium hydroxide aqueous solution was used as a solution. The overvoltage at a current density of 0.7 A/cm$^2$ lowered by 0.4 V compared to a single Ni porous body used as an electrode core. Repeated use in a current density range of from 0.01 A/cm$^2$ to 1.0 A/cm$^2$ revealed that no peel of the plated film was recognized.

Embodiment 6

Embodiment 6 shows an instance of an electrolytic hydrogen producing apparatus wherein an electrode used for an electrolytic hydrogen producing apparatus of an alkaline aqueous solution is employed.

Figure 5:
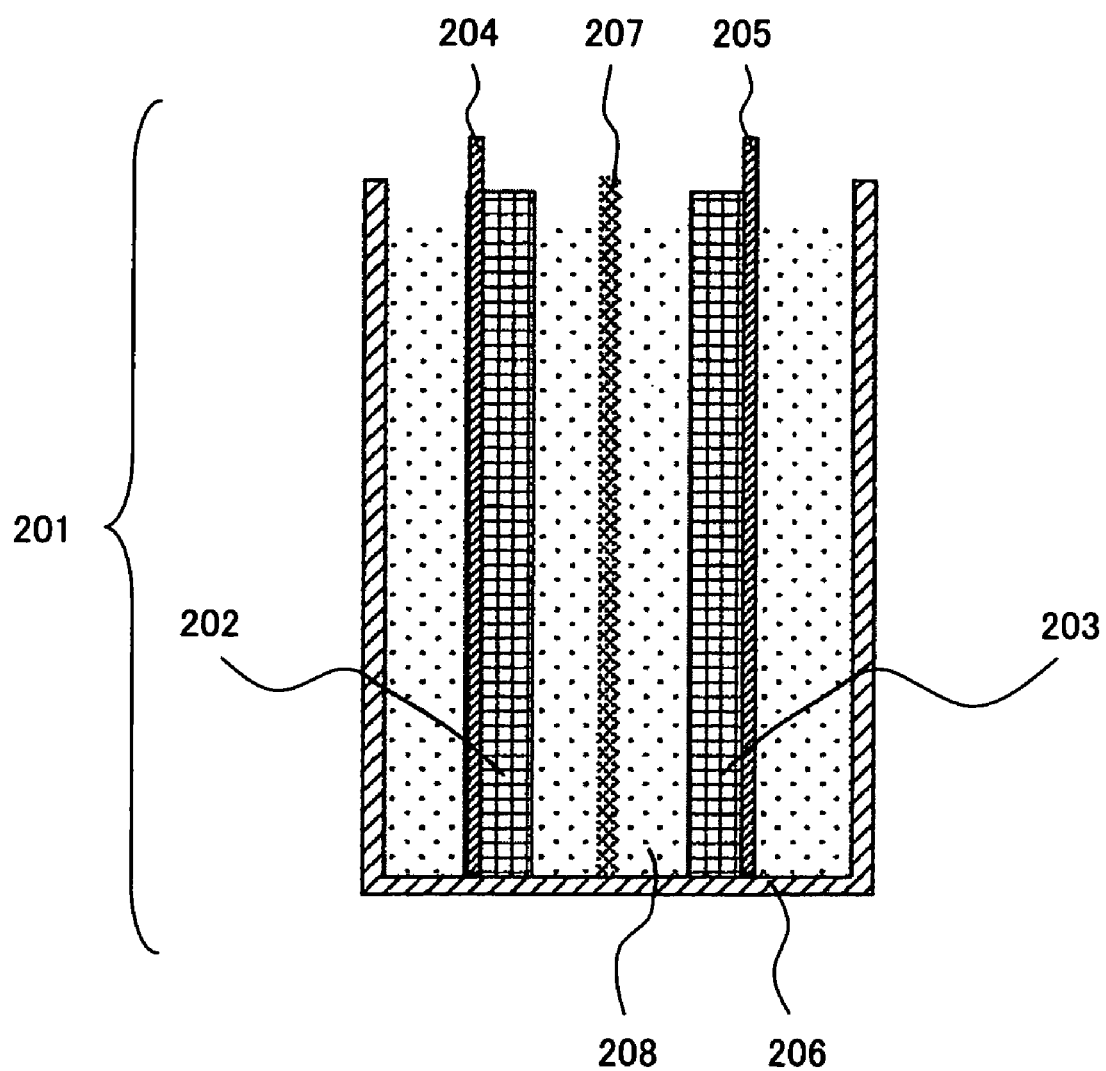
FIG. 5 is a schematic view of an electrolytic hydrogen producing apparatus of the invention.

FIG. 5 shows a schematic view of a hydrogen producing apparatus. An electrolytic hydrogen producing apparatus 201 includes a hydrogen electrode 202, an oxygen electrode 203, bus bars 204, 205 connected thereto, respectively, a housing 206 and a partition wall 207. An electrolyte aqueous solution 208 used was a 1M potassium hydroxide aqueous solution. The electrode made in Embodiment 3 was used as the hydrogen electrode 202 and the oxygen electrode 203, respectively, and spot-bonded at plural portions thereof with the bus bars 204 and 205, each made of a nickel sheet. The partition wall 207 was made of a self-made polyimide non-woven fabric and the housing 206 was made of polypropylene.

The bus bars 204, 205 were connected to a DC power supply and a voltage was applied thereto, whereupon electrolysis took place to obtain hydrogen and oxygen, respectively. The current density was at 1.0 A/cm$^2$ in maximum. Repeated use in the current density range of from 0.01 A/cm$^2$ to 1.0 A/cm$^2$ revealed that no peel of the plated film was found at both hydrogen electrode 202 and oxygen electrode 203. It will be noted that with this apparatus, similar effects were obtained when the hydrogen electrode 202 and the oxygen electrode 203 were connected directly to a DC power supply without use of the bus bars.

Embodiment 7

Embodiment 7 is an instance of an electrolytic hydrogen producing apparatus wherein the electrode of the invention is used in the electrolytic hydrogen producing apparatus of an alkaline aqueous solution and an electrode unit is provided with a gas-liquid separation function.

Figure 6:
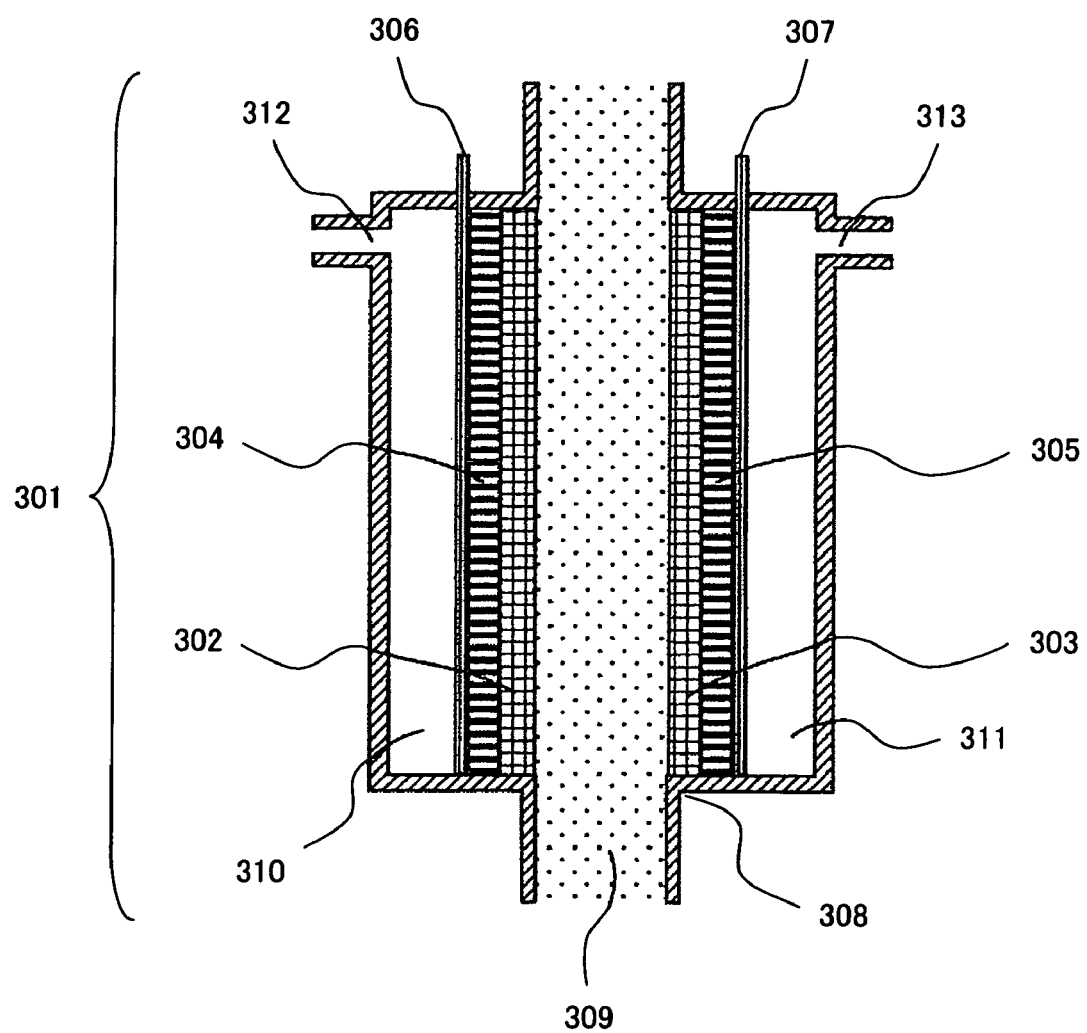
FIG. 6 is a schematic view of an electrolyzer for an electrolytic hydrogen producing apparatus having gas-liquid separability.

FIG. 6 shows a schematic view showing a hydrogen producing apparatus. A hydrogen producing apparatus 301 includes a hydrogen electrode 302, an oxygen electrode 303, hydrophobic layers 304, 305 bonded to the respective electrodes, current collector electrodes 306, 307, and a housing 308. An electrolyte 309 used was a 1M potassium hydroxide aqueous solution. The electrode made in Embodiment 3 was adopted as the hydrogen electrode 302 and the oxygen electrode 303, respectively. A mixture of carbon black and a PTFE dispersion was applied onto one side of the respective electrodes and dried, followed by hot pressing to form the hydrophobic layers 304, 305. The hydrogen and oxygen generated at the electrodes were separated from the liquid by means of the hydrophobic layers and the gas components alone were released from through-holes provided at the current collector electrodes 306, 307 into gas chambers 310, 311 provided inside the housing 308. The hydrogen gas and the oxygen gas inside the gas chambers 310, 311 were fed through gas discharge holes 312, 313 provided at the housing 308 to outside.

The current collector electrodes 306, 307 were connected to a DC power supply and applied with a voltage, whereupon electrolysis took place, thereby obtaining hydrogen gas and oxygen gas in the gas chambers 310, 311, respectively.

What is claimed is:

1. An electrode for electrolysis of an electrolytic solution, comprising
    an electrode core serving as a base, and
    a plurality of fine prominences formed on a surface of said electrode core,
    wherein said prominences each have a leaf-shaped form rising from the surface of said electrode core, and the leaf-shaped form of said prominences have a minor-axis length of 5 to 100 nm, a major-axis length of 50 to 5000 nm and a height of 100 to 10000 nm.

2. The electrode according to claim 1, wherein said prominences structures are each made mainly of Ni.

3. The electrode according to claim 1, wherein said electrode core is made of at least one of Cu, Ni and Fe.

4. The electrode according to claim 1, wherein said electrode core has a form of a flat sheet, a corrugated sheet, a metal mesh, a porous body, a wire rod, a tube or a film.

5. The electrode according to claim 1, wherein said prominences are formed on opposite sides of said electrode core.

6. An electrolyzer comprising a hydrogen electrode and an oxygen electrode arranged in face-to-face relation with each other, an electrolytic solution supplied between said hydrogen electrode and said oxygen electrode, said hydrogen electrode and said oxygen electrode each being made of the electrode defined in claim 1.

7. The electrolyzer according to claim 6, wherein said hydrogen electrode and said oxygen electrode each have a face in contact with said electrolytic solution and a face in contact with a gas and also have a gas-liquid separation function.

8. The electrolyzer according to claim 6, wherein said electrolytic solution is made of an alkaline aqueous solution.

9. An electrode for electrolysis of an electrolytic solution, comprising
    an electrode core serving as a base, and
    a plurality of fine prominences formed on a surface of said electrode core,
    wherein said prominences are formed by electroplating, and
    wherein said electrode core and said prominences are metal-bonded with each other.

10. The electrode according to claim 9, wherein said electrode core is in the form of a flat sheet, a corrugated sheet, a metal mesh, a porous body, a wire rod, a tube or a film.

11. The electrode according to claim 9, wherein said prominences are formed on opposite sides of said electrode core.

12. The electrode according to claim 9, wherein said electrode core has a form of a metal mesh or a porous body and said prominences are formed on opposite sides of said electrode core.

13. An electrode for electrolysis of an electrolytic solution, comprising
   an electrode core serving as a base, and
   a plurality of fine prominences formed on a surface of said electrode core,
   wherein said prominences each have a leaf-shaped form rising from the surface of said electrode core, and
   wherein said electrode core is metal-bonded with said prominences.

14. The electrode according to claim 13, wherein said prominences structures are each made mainly of Ni.

15. The electrode according to claim 13, wherein said electrode core is made of at least one of Cu, Ni and Fe.

16. The electrode according to claim 13, wherein said electrode core has a form of a flat sheet, a corrugated sheet, a metal mesh, a porous body, a wire rod, a tube or a film.

17. The electrode according to claim 13, wherein said prominences are formed on opposite sides of said electrode core.

* * * * *